United States Patent [19]
Hayashi et al.

[11] Patent Number: 5,790,504
[45] Date of Patent: Aug. 4, 1998

[54] INTEGRATED OPTICAL HEAD WITH AN EMITTING LIGHT SPLITTING POLARIZING PRISM AND A DETECTING LIGHT SPLITTING POLARIZING ELEMENT

[75] Inventors: Takao Hayashi, Toyonaka; Toru Nakamura, Katano; Akihiro Arai, Kyoto, all of Japan

[73] Assignee: Matsushita Electric Industrial Co., Ltd., Osaka, Japan

[21] Appl. No.: 657,741

[22] Filed: May 31, 1996

[30] Foreign Application Priority Data

Jun. 2, 1995 [JP] Japan ................. 7-136462

[51] Int. Cl.$^6$ ............................................. G11B 7/08
[52] U.S. Cl. ................. 369/112; 369/44.14; 369/44.23; 369/110; 369/13; 369/122
[58] Field of Search ........................ 369/112, 110, 369/44.23, 44.12, 13, 103, 121, 122, 44.14

[56] References Cited

U.S. PATENT DOCUMENTS

| | | | |
|---|---|---|---|
| 5,453,961 | 9/1995 | Brazas | 369/112 |
| 5,526,330 | 6/1996 | Ogata et al. | 369/112 |
| 5,528,575 | 6/1996 | Saito | 369/110 |
| 5,557,601 | 9/1996 | Nishikawa | 369/121 |
| 5,559,769 | 9/1996 | Ando et al. | 369/44.27 |

FOREIGN PATENT DOCUMENTS 5-205339  8/1993  Japan.

Primary Examiner—David C. Nelms
Assistant Examiner—Kim-Kwok Chu
Attorney, Agent, or Firm—McDermott, Will & Emery

[57] ABSTRACT

A magneto-optical pick-up for recording and reproducing information to an information recording medium comprises an optical module comprising an integral light emitting element and receptor element having plural light reception areas, and a diffraction grating on the light incident/emission plane, an objective lens, a polarizing prism provided integrally to the optical module in the light path between the light-emitting element and an objective lens and having the reflectivity and transmittance differing for P-polarized and S-polarized lights, and a polarizing element provided internally or integrally to the optical module which divides the light reflected by or passed through the polarizing prism into light having at least two mutually-perpendicular polarization components to guide the divided lights to the receptor element.

13 Claims, 11 Drawing Sheets

INTEGRATED OPTICAL HEAD WITH AN EMITTING LIGHT SPLITTING POLARIZING PRISM AND A DETECTING LIGHT SPLITTING POLARIZING ELEMENT

BACKGROUND OF THE INVENTION

1. Field of the Invention

The present invention relates to a magneto-optical pick-up for an optical recording and reproducing apparatus used in an external data storage device storing audio and video files, text files, and other computer data by repeatedly writing and reading said information by means of an optical beam and the magneto-optical effect.

2. Description of the prior art

Photo-electro-magnetic recording and reproducing devices have been developed in recent years as one type of optical recording and reproducing device capable of repeatedly rewriting and reading data to the same medium. The magneto-optical pick-up is a fundamental component of the magneto-optical recording and reproducing system, and technologies reducing the size of the magneto-optical pick-up have been actively researched.

A conventional magneto-optical pick-up designed for compactness is described in Japanese tokay H5-205339, and is described below with reference to FIGS. 20A and 20B from tokay H5-205339.

As shown in FIG. 20A, photodiodes 113 and 114 are formed on silicon substrate 112, and are divided into three segments A–C and D–F in the same direction as the photodiode orientation, as illustrated in FIG. 20B, and the direction perpendicular thereto. The polarizing film 115 disposed over the complete surface of the Si substrate 112 passes only P-polarized light and reflects S-polarized light. A non-polarizing film 121 with 50% reflectivity is also formed on the sloping sides of the micro prism formed on the polarizing film 115 above the photodiodes 113 and 114. A quarter-wave length plate 117 is formed above the prism 116, and is coated with a total reflection film 118. Another Si substrate 123 is also formed on the polarizing film 115 at a position opposing the sloping surface of the prism 116. The laser diode 125 is disposed on the Si substrate 123, and emits light of which the polarization plane is inclined 45 degrees to the incidence plane of the non-polarizing film 121. Another photodiode 124 is also provided on the Si substrate 123 at a position on the side opposite the side facing the non-polarizing film 121 of the laser diode 125. An objective lens 126 is also provided above the inclined surface of the prism 116.

The basic operation of the magneto-optical pick-up thus comprised according to the prior art is described below.

The light 128 emitted from the laser diode 125 is incident to the non-polarizing film 121, which reflects only 50% of the light 128 upward. The light 128 reflected by the non-polarizing film 121 is focused by the objective lens 126 on the photo-electro-magnetic recording medium 129 (magneto-optical disk), and the polarization plane is rotated by the magnetic signal recorded to the recording medium 129.

The light 128 reflected from the recording medium 129 passes through the objective lens 126 again and is incident on the non-polarizing film 121; 50% of this incident light passes the non-polarizing film 121. The light 128 passed through the non-polarizing film 121 travels through the prism 116 and is incident on the polarizing film 115.

Of the light incident on the polarizing film 115, only the P-polarized light component passes and is incident to the photodiode 113. The S-polarized light component is reflected by the polarizing film 115. This reflected S-polarized light travels through the prism 116, passes the quarter-wave length plate 117 and is incident on the total reflection film 118, and is thus reflected by the total reflection film 118 and passed again through the quarter-wave length plate 117. The S-polarized light component of the emitted light 128 thus travels twice through the quarter-wave length plate 117, and is thereby converted to P-polarized light. While the light 128 reflected by the total reflection film 118 travels through the prism 116 and is incident on the polarizing film 115, the light 128 is now converted to P-polarized light as described above and therefore passes through the polarizing film 115 and is incident on the other photodiode 114. The photo-electro-magnetic signal RF is thus obtained by differential detection where RF=(A+B+C)−(D+E+F).

When the magneto-optical pick-up is focused on the recording medium 129, the light 128 is focused on the total reflection film 118 as shown in FIG. 20B, and the light spots on the photodiodes 113 and 114 have the same diameter. The focus error signal FE can thus also be obtained by differential detection where FE=(A+C+E)−(B+D+F).

The light 128 emitted from the laser diode 125 in the direction away from the non-polarizing film 121 is incident on photodiode 124. The change in the amount of light 128 emitted from the laser diode 125 can thus be determined by detecting the change in the amount of light 128 received by the photodiode 124.

With the configuration thus described, the operation reflecting the light 128 emitted from the laser diode 125, and the operation passing the light reflected from the recording medium 129, are both achieved by a non-polarizing film 121 of which the reflectivity and transmittance do not contribute to the direction of light polarization. Because both the reflectivity and transmittance of this non-polarizing film 121 are a low 50%, light utilization efficiency is poor. This makes an expensive, high output laser diode 125 necessary. Because the transmittance of the polarization component rotated only a minimal angle by the magnetic signal recorded to the recording medium 129 is also poor, i.e., the transmittance of the photo-electro-magnetic signal is also poor, a sufficient signal/noise ratio (S/N ratio) is not achieved in the photo-electro-magnetic signal, and good performance is not obtained from the magneto-optical pick-up.

A second Si substrate 123 is also required in addition to the Si substrate 112 in order to mount the laser diode 125, photodiode 124, and expensive quarter-wave length plate 117, which is made, for example, of quartz. The number of components in the magneto-optical pick-up is therefore large, and achieving a low cost magneto-optical pick-up is extremely difficult.

SUMMARY OF THE INVENTION

Therefore, the object of the present invention is to provide a compact magneto-optical pick-up for a photo-electro-magnetic recording and reproducing apparatus where the light utilization efficiency of the magneto-optical pick-up is good, a good S/N ratio can be obtained, and expensive light-emitting elements and other components are not required.

To achieve this object, a magneto-optical pick-up according to the present invention comprises an optical module comprising an integral light-emitting element and receptor element having plural light reception areas, and a diffraction grating on the light incidence/emission plane; a condensing element for irradiating light emitted from the light-emitting element to the information recording medium; a polarizing prism provided integrally to the optical module in the light path between the light-emitting element and the condensing element, and characterized by the reflectivity and transmittance of the polarizing prism differing for P-polarized light and S-polarized light; and an analyzer provided internally or integrally to the optical module for dividing the light reflected or passed by the polarizing prism into light having at least two mutually-perpendicular polarization components. [Operation]

With the polarizing prism of the invention, the reflectivity and transmittance differ for P-polarized light and S-polarized light, thereby improving the efficiency with which the light emitted from the light-emitting element is reflected or transmitted, and improving the efficiency with which the photo-electro-magnetic signal component generated by the slight rotation of the polarization plane by the photo-electro-magnetic recording medium is reflected or transmitted. The light utilization efficiency is thus improved, and a sufficient S/N ratio can be assured.

Because the light utilization efficiency is good, a high cost, high output light-emitting element is not needed, and the quarter wave length plate and plural substrates are not needed. Unit cost is therefore easily reduced. By also integrating the optical module and polarizing prism while disposing the analyzer inside the optical module, an extremely small magneto-optical pick-up can also be achieved.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of a magneto-optical pick-up according to the present invention are described below with reference to the accompanying figures.

Figure 1:
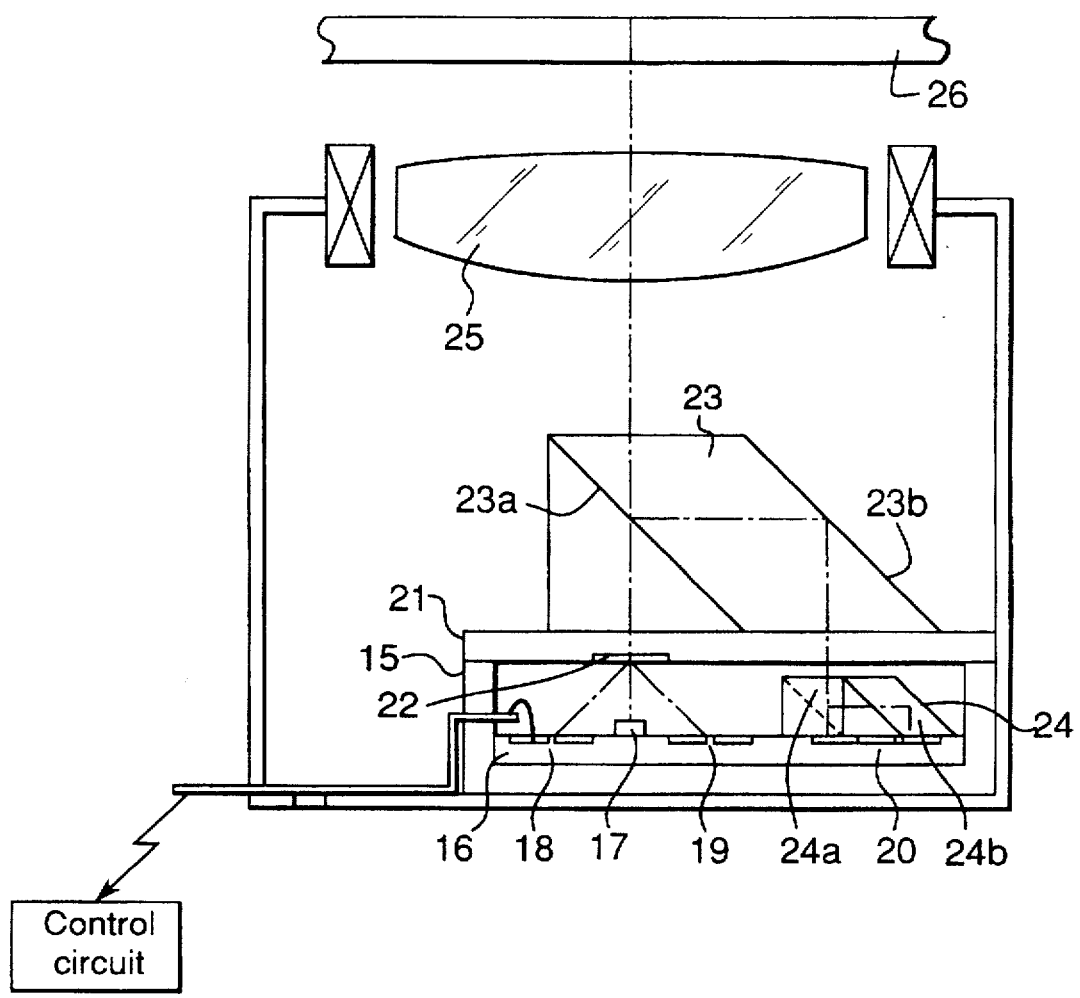
FIG. 1 is a conceptual side view of a magneto-optical pick-up according to the first embodiment of the invention.
Figure 2:
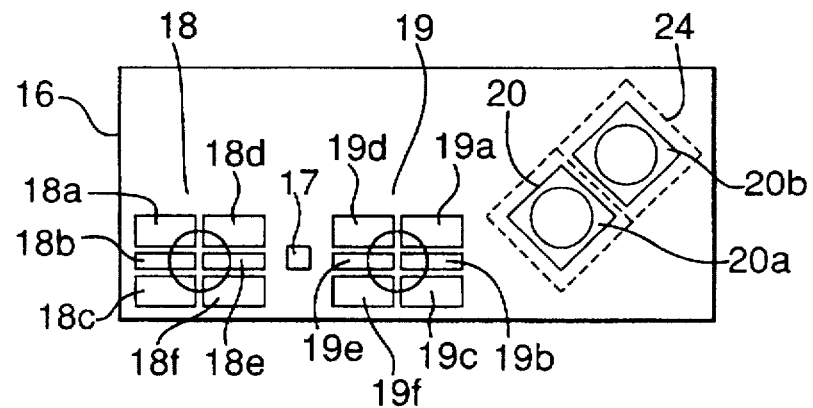
FIG. 2 is a plan view of the receptor element, light-emitting element, and analyzer in the first embodiment.

FIG. 1 is a side view of a magneto-optical pick-up according to the first embodiment of the invention, and FIG. 2 is a plan view of the receptor element, light-emitting element, and analyzer in the first embodiment.

As shown in FIGS. 1 and 2, a substrate 16 is provided inside the optical module 15 having a box-like casing made of a resin or metal. A laser diode 17 as the light-emitting element, and photodiodes 18, 19, and 20 as receptor elements, are provided on said substrate 16. The laser diode 17 is disposed with the light-emitting chip inside a recess having sides sloping at an approximately 45 degree angle provided in the substrate 16. When the laser diode 17 emits, the emitted light hits the 45° sloping sides, and is reflected upward. The photodiodes 18 and 19 each comprise six elements 18a–18f and 19a–19f as shown in FIG. 2. Photodiode 20 comprises two elements 20a and 20b arrayed at an approximately 45 degree angle to the orientation of photodiodes 18 and 19.

A transparent substrate 21 made of glass or resin seals the optical module 15, and comprises thereon at the surface area opposing the laser diode 17 a holographic diffraction grating 22 (diffraction grating). This holographic diffraction grating 22 has a lens effect whereby the focal point of +/−1St. order diffracted light diffracted 5–20 degrees differs.

The polarizing prism 23 has a trapezoidal cross section formed by bonding a prism with a triangular cross section to a prism with a parallelogram cross section. The bonding surface is a polarized light separation plane 23a. When the light emitted from the laser diode 17 is, for example, P-polarized light, the transmittance and reflectivity of the polarized light separation plane 23a to P-polarized light is approximately 70% and 30%, respectively, and the reflectivity to S-polarized light is approximately 100%. The polarizing prism 23 is formed integrally to the transparent substrate 21, and the slope 23b of the polarizing prism 23 is inclined to guide light into the optical module 15.

A prism-type analyzer 24 is similarly formed with a trapezoidal cross section formed by bonding a prism with a triangular cross section to a prism with a parallelogram cross section. The bonding surface is a polarized light separation plane 24a of which the transmittance to P-polarized light is approximately 100%, and the reflectivity to S-polarized light is also approximately 100%. The prism-type analyzer 24 is provided on the substrate 16 over the photodiode 20 such that the polarized light separation plane 24a is disposed above element 20a of the photodiode 20, and slope 24b is disposed above element 20b of the photodiode 20. As a result, the triangular cross section prism element of the prism-type analyzer 24 is positioned above element 20a of the photodiode 20, and the parallelogram cross section prism element is positioned above element 20b.

The objective lens 25 is a condensing element provided above the polarizing prism 23 to focus light on the magneto-optical recording medium 26 used as the information recording medium.

It should be noted that the holographic diffraction grating 22 may be disposed on the top of the transparent substrate 21 at a position opposing the polarizing prism 23 rather than on the bottom of the transparent substrate 21 at a position opposing the laser diode 17.

It is also possible to eliminate the transparent substrate 21, and provide the holographic diffraction grating 22 directly on the polarizing prism 23 at a position opposing the laser diode 17.

Furthermore, while both the polarizing prism 23 and prism-type analyzer 24 are elements having a trapezoidal cross section formed by bonding a prism with a triangular cross section to a prism with a parallelogram cross section, it is also possible to achieve this trapezoidal shape by bonding three triangular cross section prisms.

As illustrated in FIG. 1 schematically, the optical module 15 is installed in a pick-up frame PF made of a resin or a metal and the objective lens 25 is supported by the frame PF in a well-known manner so that the light beam is focused on the magneto-optical recording medium 26 correctly. Plural lead terminals L are drawn out from a side wall of the package of the module 15 to the outside of the pick-up frame PF. One end of each lead terminal L is connected to a corresponding device by a wire bonding and the other end thereof is connected to a control circuit CC for electrically controlling the pick-up in a manner well known to those skilled in the art.

It is desirable to fill an inert gas such as Ar or the like in the inner space of the optical module 15 to protect elements and devices housed inside the optical module 15 from deterioration.

The basic operation of the magneto-optical pick-up according to the present invention as thus comprised is described below.

P-polarized light emitted from the laser diode 17 passes the holographic diffraction grating 22 formed on the transparent substrate 21, and is incident on the polarized light separation plane 23a of the polarizing prism 23. Because the reflectivity and transmittance of this polarized light separation plane 23a to P-polarized light are approximately 30% and 7%, respectively, and the reflectivity to S-polarized light is approximately 100%, approximately 70% of the light passes the polarized light separation plane 23a and is focused on the magneto-optical recording medium 26 by the objective lens 25. The polarization plane of this light is rotated approximately 0.5 degree by the photo-electro-magnetic signal recorded to the magneto-optical recording medium 26, and is reflected as a photo-electro-magnetic signal component with a nominal S-polarized light component. This reflected light passes back through the objective lens 25 and is incident on the polarized light separation plane 23a of the polarizing prism 23.

Because the reflectivity and transmittance of this polarized light separation plane 23a to P-polarized light are approximately 30% and 70%, respectively, and the reflectivity to S-polarized light is approximately 100%, approximately 70% of the P-polarized light component passes through while approximately 30% of the P-polarized light component and 100% of the S-polarized light, which is the photo-electro-magnetic signal component, are reflected. The light reflected by the polarized light separation plane 23a is reflected by the slope 23b, passes the transparent substrate 21 to enter the optical module 15, and is incident on the polarized light separation plane 24a of the prism-type analyzer 24.

Because the transmittance to P-polarized light is approximately 100% and the reflectivity to S-polarized light is also approximately 100% at this polarized light separation plane 24a, the P-polarized light component passes through and is incident on element 20a of the photodiode 20. The S-polarized light component is reflected from the polarized light separation plane 24a to slope 24b, and is reflected by slope 24b to photodiode element 20. Thus, if the signals obtained by elements 20a and 20b of the photodiode 20 are expressed with the same sign, the photo-electro-magnetic signal RF can be obtained by the difference detection $$RF = 20a - 20b. \quad [1]$$

The light passing the polarized light separation plane 23a of the polarizing prism 23 is incident on the holographic diffraction grating 22 formed on the transparent substrate 21. This incident light is diffracted with a diffraction angle of approximately 5–25 degrees such that, for example, the +1St. order diffracted light is incident on the one photodiode 18, and the −1St. order diffracted light is incident on the other photodiode 19. Because the holographic diffraction grating 22 has a lens effect whereby the focal points of +1St. order and −1St. order diffracted light differ, the +1St. order diffracted light is focused, for example, at a point closer to the holographic diffraction grating 22 than the photodiode 18, and the −1St. order diffracted light is focused at a point beyond the photodiode 19. As a result, when the magneto-optical pick-up is focused on the magneto-optical recording medium 26, the light spots formed on the photodiodes 18 and 19 have the same diameter as shown in FIG. 2. The focus error signal FE can thus be obtained by the difference detection $$FE = \{(18a + 18c + 18d + 18f) + (19b + 19e)\} - \{(18b + 18e) + (19a + 19c + 19d + 19f)\} \quad [2]$$

If the magneto-optical pick-up is disposed such that the dividing line separating elements 18a–18c and elements 18d–18f of the one photodiode 18, and the dividing line separating elements 19a–19c and elements 19d–19f of the one photodiode 19, are parallel to the direction of the data tracks of the magneto-optical recording medium 26, the light spots formed on the photodiodes 18 and 19 will move respectively in the directions opposite the direction intersecting the data track when the magneto-optical pick-up becomes offset from the data track of the magneto-optical recording medium 26. Tracking error can thus be determined by obtaining the tracking error signal TE with a similar difference detection operation where $$TE = \{(18a + 18b + 18c) + (19a + 19b + 19c)\} - \{(18d + 18e + 18f) + (19d + 19e + 19f)\}. \quad [3]$$

The magneto-optical pick-up according to the present invention can therefore be built compactly with high light utilization efficiency and a sufficient S/N ratio in the photo-electro-magnetic signal by providing integrally to the optical module 15 a polarizing prism 23 whereof the reflectivity and transmittance differ with P-polarized light and S-polarized light.

Furthermore, by providing a substrate 16 integrally comprising a laser diode 17 and photodiodes 18, 19, and 20 inside the optical module 15, and integrally disposing a prism-type analyzer 24 on this same substrate 16, the need for a quarter wave length plate and plural substrates is eliminated, and the magneto-optical pick-up can be easily comprised compactly and at a low cost.

Reliability and durability with respect to changes in temperature and humidity can also be improved by sealing the inside of the optical module 15 with a transparent substrate 21.

[Embodiment 2]

An alternative embodiment of a magneto-optical pick-up according to the present invention is described below with reference to FIGS. 3 and 4. Note that like parts in this embodiment and that described above are identified by like references, and further detailed description thereof is omitted below.

Figure 3:
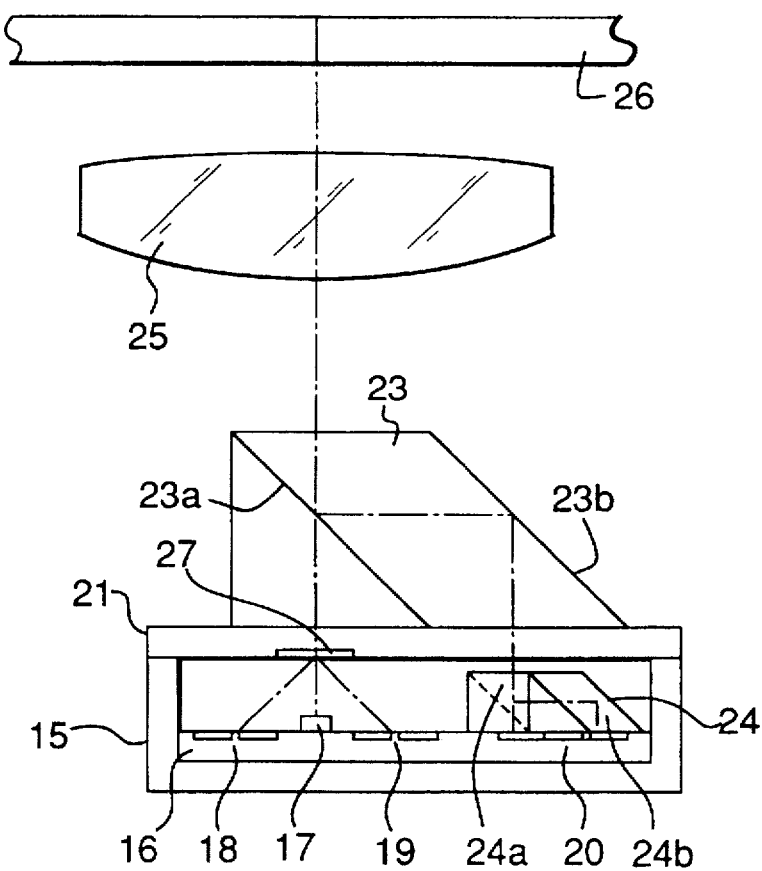
FIG. 3 is a side view of a magneto-optical pick-up according to the second embodiment of the invention.
Figure 4:
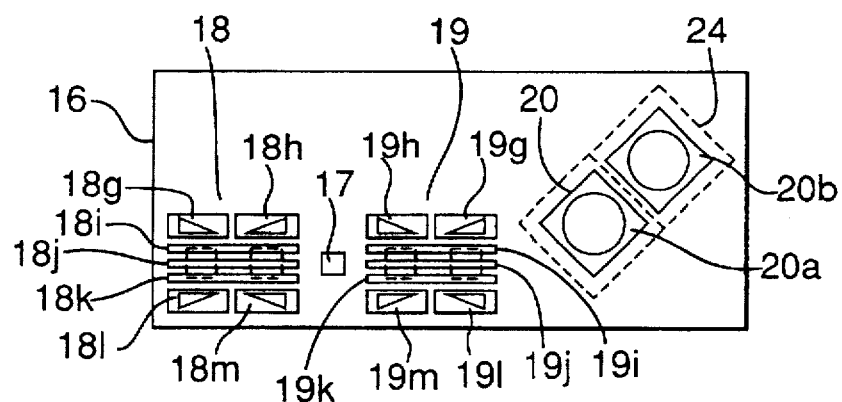
FIG. 4 is a plan view of the receptor element, light-emitting element, and analyzer in the second embodiment.
Figure 5:
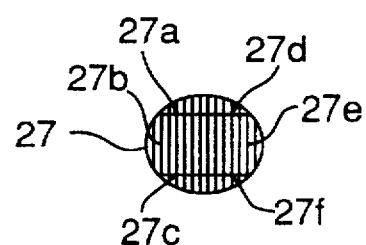
FIG. 5 is a top view of the diffraction grating.

FIG. 3 is a side view of a magneto-optical pick-up according to the second embodiment of the invention, FIG. 4 is a plan view of the receptor element, light-emitting element, and analyzer in this embodiment, and FIG. 5 is a top view of the diffraction grating in this embodiment.

What differs between this embodiment as shown in FIG. 3 and the first embodiment in FIG. 1 is that the centers of photodiodes 18 and 19 are each divided into three elements 18$i$–18$k$ and 19$i$–19$k$, respectively, in the direction perpendicular to the orientation of the photodiodes 18 and 19. These center elements 18$i$–18$k$ and 19$i$–19$k$ are then bracketed by four corner elements 18$g$, 18$h$ and 18$l$, 18$m$, and 19$g$, 19$h$ and 19$l$, 19$m$, respectively, arrayed in the same orientation as the photodiodes 18 and 19. A segmented holographic diffraction grating 27 is also used as the diffraction grating of the Claims in place of the holographic diffraction grating 22 of the first embodiment.

The segmented holographic diffraction grating 27 also has a lens effect with the pupil area thereof divided into six segments 27$a$–27$f$, each of which has a different pattern. The +1St. order diffracted light diffracted by segment 27$a$ of the segmented holographic diffraction grating 27 is guided to element 18$h$ of the one photodiode 18, and the −1St. order diffracted light is guided to element 19$m$ of the other photodiode 19. In a similar manner, the +/−1St. order diffracted light from segment 27$d$ is guided to elements 18$g$ and 19$l$ of photodiodes 18 and 19; that from segment 27$c$ is guided to elements 18$m$ and 19$h$; and that from segment 27$f$ is guided to elements 18$l$ and 19$g$. The +/−1St. order diffracted light from segments 27$b$ and 27$e$ is also guided in parallel to the three center segments 18$i$–18$k$ and 19$i$–19$k$ of the photodiodes 18 and 19. The size of the partial light spot formed on segments 18$g$, 18$h$, 18$l$, and 18$m$, and 19$g$, 19$h$, 19$l$, and 19$m$ of the photodiodes 18 and 19, respectively, is sufficiently smaller than the area of those segments, and the length of the segments 18$i$–18$k$ and 19$i$–19$k$ in the direction parallel to the orientation of the photodiodes 18 and 19 is sufficiently longer than the size of the segmented light spot received by said segments.

The basic operation from light emitting by the laser diode 17 until the photo-electro-magnetic signal RF is obtained is identical to that of the first embodiment above and is therefore omitted below. Similarly to the holographic diffraction grating 22 of the first embodiment, the segmented holographic diffraction grating 27 of this embodiment also has a lens effect whereby the focal points of +/−1St. order diffracted light differ. As a result, the focus error signal FE can be obtained by the difference detection $$FE=(18i+18k+19j)-(18j+19i+19k)  \quad [4]$$

In addition, if the interference region of the diffracted light at the data track of the magneto-optical recording medium 26 passes segments 27$a$, 27$c$, 27$d$, and 27$f$ of the segmented holographic diffraction grating 27, the tracking error signal TE can be obtained by the difference detection $$TE=(18g+18l+19g+19l)-(18h+18m+19h+19m) \quad [5]$$

As with the first embodiment above, it is therefore possible by means of this second embodiment to achieve a magneto-optical pick-up having high light utilization efficiency, a sufficient S/N ratio in the photo-electromagnetic signal, high reliability, high durability, and a compact, low-cost construction. It is also possible, however, to achieve a magneto-optical pick-up whereby the segmented light spot received by the photodiode does not deviate from the respective receptor element segments, i.e., the magneto-optical pick-up is resistant to the effects of wavelength disturbance, even when the wavelength of the emissions from the laser diode 17 varies due to external noise and the diffraction angle of the segmented holographic diffraction grating 27 thus fluctuates. This is because the size of the partial light spot formed on segments 18$g$, 18$h$, 18$l$, and 18$m$, and 19$g$, 19$h$, 19$l$, and 19$m$ of the photodiodes 18 and 19, respectively, is sufficiently smaller than the area of those segments, and the length of the segments 18$i$–18$k$ and 19$i$–19$k$ in the direction parallel to the orientation of the photodiodes 18 and 19 is sufficiently longer than the size of the segmented light spot received by said segments.

[Embodiment 3]

A third embodiment of a magneto-optical pick-up according to the present invention is described below with reference to FIGS. 6–8. Note that like parts in this embodiment and that described above are identified by like references, and further detailed description thereof is omitted below.

Figure 6:
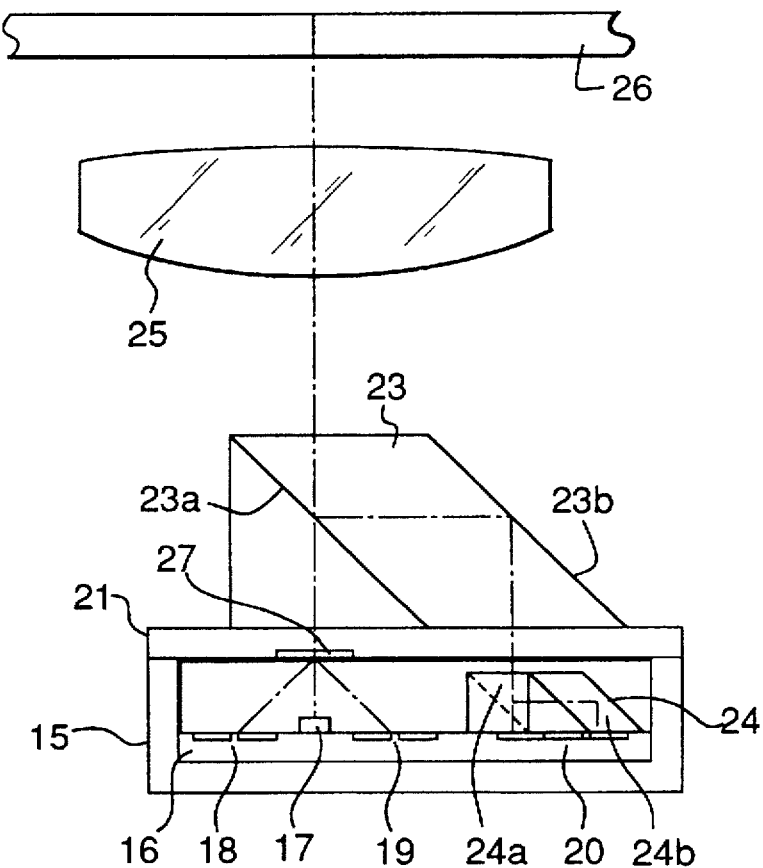
FIG. 6 and FIG. 7 are different side views of a magneto-optical pick-up according to the third embodiment of the invention.
Figure 7:
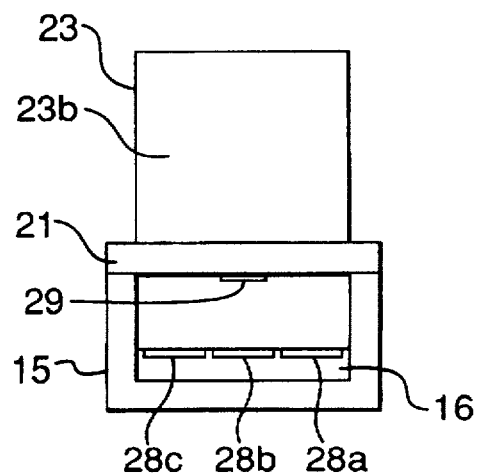
Figure 8:
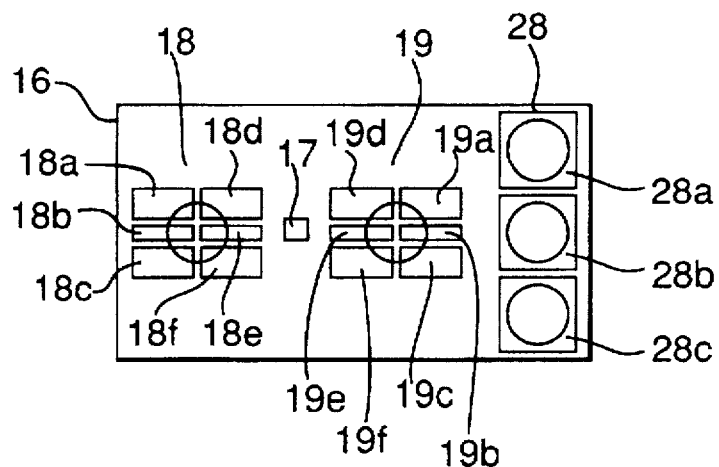
FIG. 8 is a plan view of the receptor element and light-emitting element.

FIG. 6 and FIG. 7 are different side views of a magneto-optical pick-up according to the third embodiment of the invention, and FIG. 8 is a plan view of the receptor element and light-emitting element in this embodiment.

What differs between this embodiment as shown in FIG. 6 and the first embodiment in FIG. 1 is the structure of the photodiode 28 used in place of the photodiode 20, and the structure of the flat polarizing diffraction grating 29 used in place of the prism-type analyzer 24. More specifically, the photodiode 28 is divided into three elements 28$a$, 28$b$, and 28$c$ in the direction perpendicular to the orientation axis of the photodiodes 18 and 19, and the polarizing diffraction grating 29 is made from lithium niobate.

The flat polarizing diffraction grating 29 separates the light incident thereon into two mutually-perpendicular linear polarized light components, emits one of these linear polarized light components as zero order light, and emits the other linear polarized light component as +/−1St. order light. The polarizing diffraction grating 29 is provided on the surface of the transparent substrate 21 inside the optical module 15, and thus guides the zero order light to segment 28$b$ of the photodiode 28, and guides the +/−1St. order light to photodiode segments 28$a$ and 28$c$.

The basic operation from light emitting by the laser diode 17 until the focus error signal FE and tracking error signal TE are detected is identical to that of the first embodiment above and is therefore omitted below, except that the light reflected from the polarized light separation plane 23$a$ is reflected by the slope 23$b$, passes the transparent substrate 21, and enters the optical module 15 where it is incident on the polarizing diffraction grating 29. Because the light incident on the polarizing diffraction grating 29 is divided into two mutuallyperpendicular linear polarized light components, emitted as zero and +/−1St. order light, and guided to the elements 28$a$, 28$b$, and 28$c$ of the photodiode 28, the photo-electromagnetic signal RF can be obtained by the difference detection $$RF=(28a+28c)-28b \quad [6]$$

As with the first embodiment above, it is therefore possible by means of this embodiment to achieve a magneto-optical pick-up having high light utilization efficiency, a sufficient S/N ratio in the photo-electro-magnetic signal, high reliability, high durability, and a compact, low-cost construction. It is also possible, however, to further reduce the size of the magneto-optical pick-up because the substrate 16 can be made smaller by using a photodiode 28 divided into three elements 28a, 28b, and 28c in the direction perpendicular to the orientation axis of the photodiodes 18 and 19. In addition, the thickness of the magneto-optical pick-up can be further reduced by using the flat polarizing diffraction grating 29 disposed on the surface of the transparent substrate 21 inside the optical module 15 as the analyzer.

It is to be noted that while the flat polarizing diffraction grating 29 is provided on the surface of the transparent substrate 21 inside the optical module 15 in this embodiment, the same effect can obviously be obtained by providing the polarizing diffraction grating 29 between the polarizing prism 23 and the transparent substrate 21.

[Embodiment 4]

A fourth embodiment of a magneto-optical pick-up according to the present invention is described below with reference to FIGS. 9–11. Note that like parts in this embodiment and that described above are identified by like references, and further detailed description thereof is omitted below.

Figure 9:
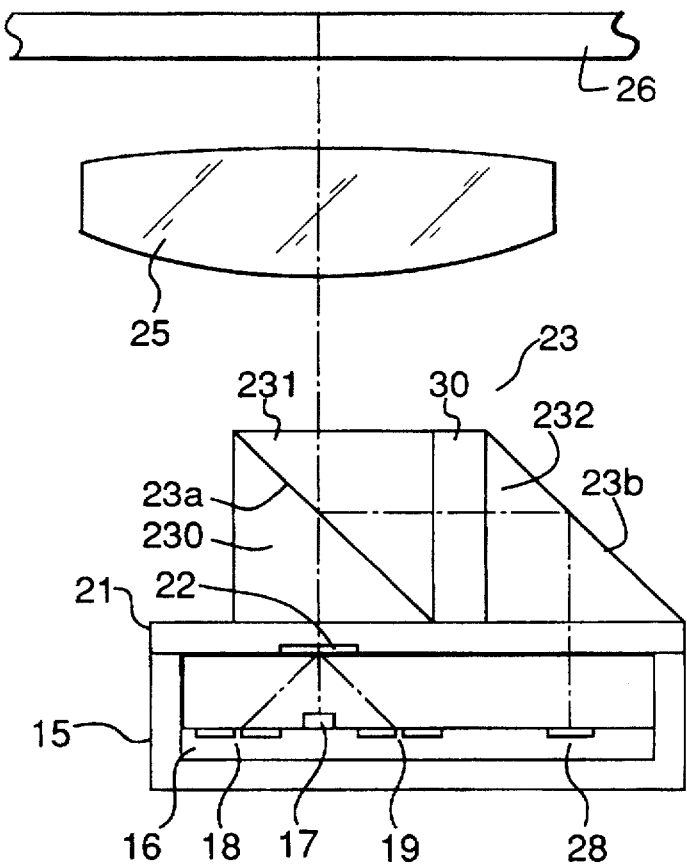
FIG. 9 and FIG. 10 are different side views of a magneto-optical pick-up according to the fourth embodiment of the invention.
Figure 10:
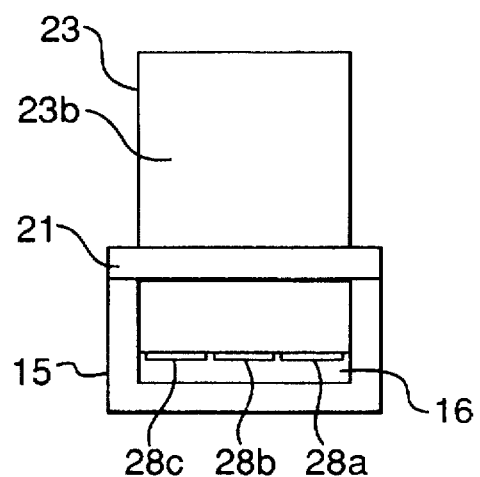
Figure 11:
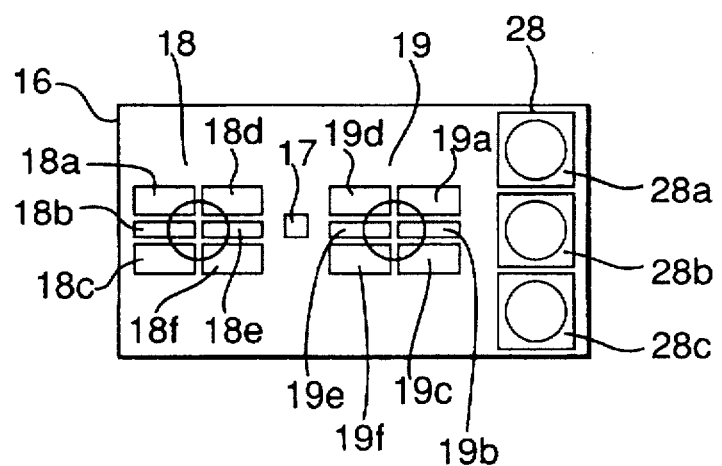
FIG. 11 is a plan view of the receptor element and light-emitting element.

FIG. 9 and FIG. 10 are different side views of a magneto-optical pick-up according to the fourth embodiment of the invention, and FIG. 11 is a plan view of the receptor element and light-emitting element in this embodiment.

What differs between this embodiment as shown in FIG. 9 and the third embodiment in FIG. 6 is that the polarizing prism 23 is not formed by bonding a prism with a triangular cross section to a prism with a parallelogram cross section, but rather by bonding together three triangular cross section prisms. The bonding surface between the first triangular prism 230 and the second triangular prism 231 forms polarized light separation plane 23a. A thin polarized light divider 30 is used in place of the flat polarizing diffraction grating 29, and is disposed between the second triangular prism 231 and the third triangular prism 232. This increases the distance between the polarized light divider 30 and the photodiode 28, and reduces the diffraction separation angle of the polarized light divider 30. In other words, the polarizing prism 23 and the thin polarized light divider 30 used as the analyzer are integrated. The polarized light divider 30 is a polarized light-dividing diffraction grating made, for example, from lithium niobate, and performs the same operation as the polarizing diffraction grating 29 shown in FIG. 6.

The basic operation from light emitting by the laser diode 17 until the photo-electro-magnetic signal RF, focus error signal FE, and tracking error signal TE are detected is identical to that of the first and third embodiments above and is therefore omitted below.

As with the first embodiment above, it is therefore possible by means of this embodiment to achieve a magneto-optical pick-up having high light utilization efficiency, a sufficient S/N ratio in the photo-electro-magnetic signal, high reliability, high durability, and a compact, low-cost construction. It is also possible, however, to use a thin polarized light divider 30 that has a small, easy-to-manufacture diffraction separation angle because the distance between the photodiode 28 and the thin polarized light divider 30 is great. This makes it possible to further reduce the cost of the magneto-optical pick-up.

It should be noted that a thin Wollaston prism can also be used for the thin polarized light divider 30. A Wollaston prism operates to separate the incident light into two mutually perpendicular linear polarized light components, which it then emits as +1St. order and −1St. order light. Thus, if the magneto-optical pick-up is constructed such that the segment 28a of the photodiode 28 receives the +1St. order light and segment 28c receives the −1St. order light, the photo-electro-magnetic signal RF can be obtained by the difference detection operation $$RF = 28a - 28c \qquad [7]$$

and segment 28b of the photodiode 28 is not needed. It is therefore possible to juxtapose segments 28a and 28c, thus enabling further reductions in the size and cost of the magneto-optical pick-up by reducing the required size of the substrate 16.

[Embodiment 5]

A fifth embodiment of a magneto-optical pick-up according to the present invention is described below with reference to FIGS. 12 and 13. Note that like parts in this embodiment and that described above are identified by like references, and further detailed description thereof is omitted below.

Figure 12:
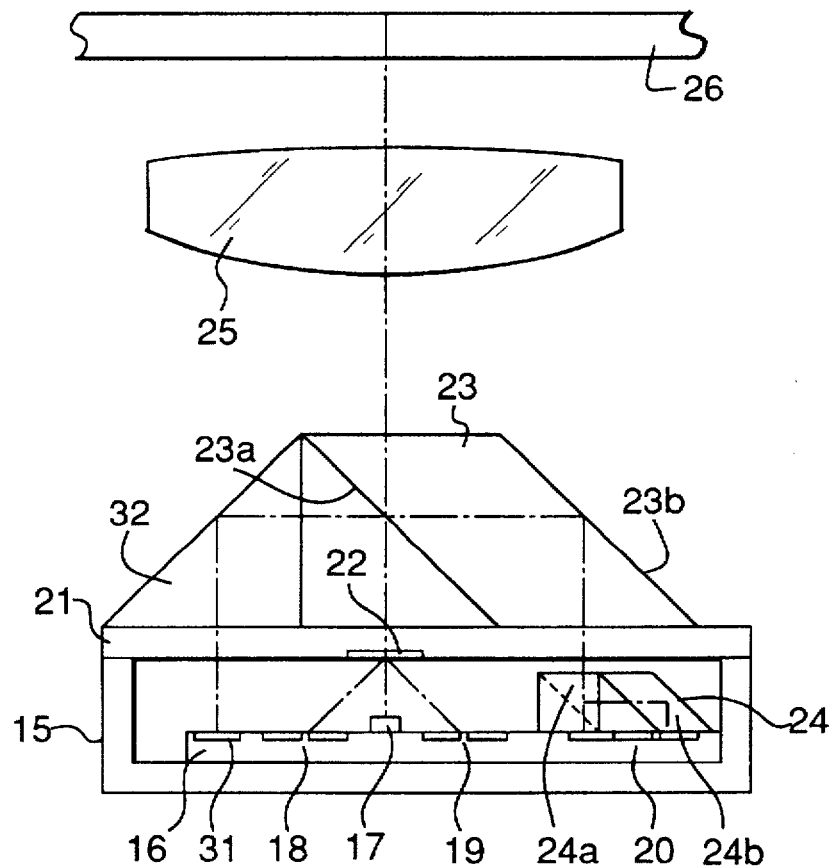
FIG. 12 is a conceptual side view of a magneto-optical pick-up according to the fifth embodiment of the invention.
Figure 13:
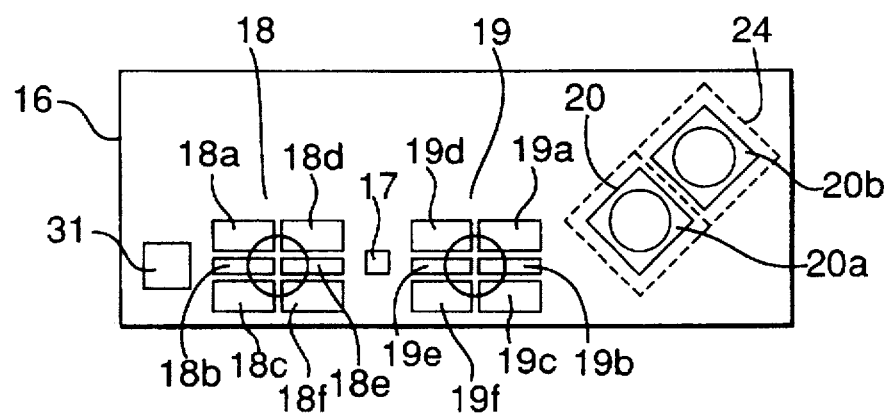
FIG. 13 is a plan view of the receptor element, light-emitting element, and analyzer.

FIG. 12 is a conceptual side view of a magneto-optical pick-up according to the fifth embodiment of the invention, and FIG. 13 is a plan view of the receptor element, light-emitting element, and analyzer in this embodiment.

What differs between this embodiment as shown in FIG. 12 and the first embodiment in FIG. 1 is that a monitor photodiode 31 is provided on the substrate 16 as the monitoring receptor element of the Claims; a reflecting mirror 32 with a triangular cross section is provided on the surface of the trapezoidal cross section polarizing prism 23 opposite the slope 23b thereof. As a result, the light emitted from the laser diode 17 and reflected by the polarized light separation plane 23a is reflected by the reflecting mirror 32 to the monitor photodiode 31.

The basic operation from light emitting by the laser diode 17 until the photo-electro-magnetic signal RF, focus error signal FE, and tracking error signal TE are detected is identical to that of the first embodiment above and is therefore omitted below. Because the transmittance and reflectivity of the polarized light separation plane 23a to P-polarized light are approximately 70% and 30%, respectively, and the reflectivity to S-polarized light is approximately 100%, approximately 30% of the light emitted from the laser diode 17 is reflected by the polarized light separation plane 23a, reflected again by the reflecting mirror 32, and is incident on the monitor photodiode 31. It is therefore possible to detect the change in the light quantity emitted from the laser diode 17 by detecting the change in the light quantity received by the monitor photodiode 31.

As with the first embodiment above, it is therefore possible by means of this embodiment to achieve a magneto-optical pick-up having high light utilization efficiency, a sufficient S/N ratio in the photo-electro-magnetic signal, high reliability, high durability, and a compact, low-cost construction.

It is also possible to determine within the optical module 15 the change in the light quantity emitted from the laser diode 17. This information can then be used for feedback control of the light quantity emitted from the laser diode 17 based on the detected light quantity change, and a magneto-optical pick-up with stable performance can be obtained.

[Embodiment 6]

A sixth embodiment of a magneto-optical pick-up according to the present invention is described below with reference to FIGS. 14 and 15. Note that like parts in this embodiment and that described above are identified by like references, and further detailed description thereof is omitted below.

Figure 14:
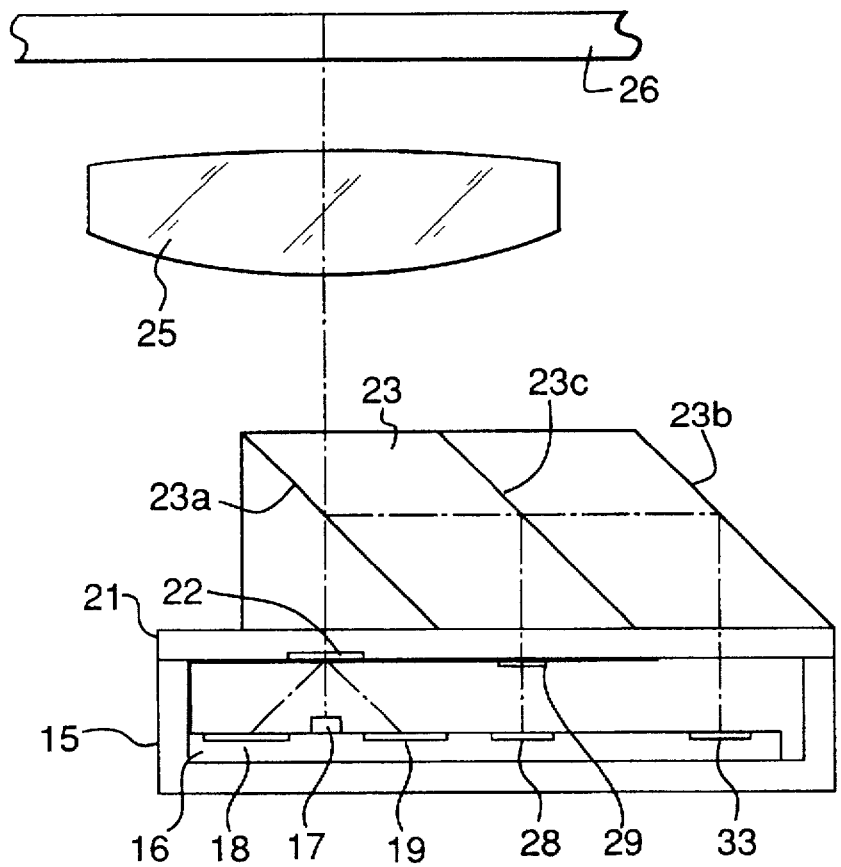
FIG. 14 is a conceptual side view of a magneto-optical pick-up according to the sixth embodiment of the invention.
Figure 15:
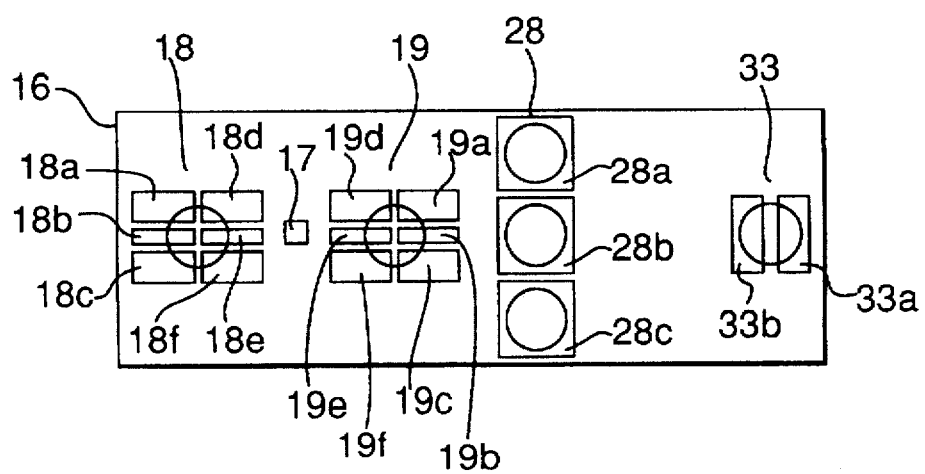
FIG. 15 is a plan view of the receptor element and light-emitting element.

FIG. 14 is a conceptual side view of a magneto-optical pick-up according to the sixth embodiment of the invention, and FIG. 15 is a plan view of the receptor element and light-emitting element.

What differs between this embodiment as shown in FIG. 14 and the embodiment in FIG. 6 is that a second polarized light separation plane 23c is provided between the slope 23b and the first polarized light separation plane 23a of the polarizing prism 23; the flat polarizing diffraction grating 29 and photodiode 28 are provided not below the slope 23b, but below the second polarized light separation plane 23c; and a photodiode 33 divided in the same direction as the orientation axis of the photodiodes 18 and 19 to form elements 33a and 33b is provided below the slope 23b. The transmittance of the second polarized light separation plane 23c to P-polarized light is approximately 30%, the reflectivity to P-polarized light is approximately 70%, and the reflectivity to S-polarized light is approximately 100%.

The photodiodes 18 and 19 are also divided perpendicularly to the orientation axes thereof into three elements 18n, 18o, and 18p, and 19n, 19o, and 19p. The length of each of these elements parallel to the orientation axis of the photodiode is sufficiently greater than the diameter of the light spots formed on the photodiodes.

The operational difference between the embodiment shown in FIG. 14 and that in FIG. 6 is that the focus error signal FE and the tracking error signal TE are detected by different photodiodes. As in the embodiment shown in FIG. 6, the focus error signal FE is obtained by the difference detection operation $$FE=(18n+18p+19o)-(18o+19n+19p)\cdot \qquad [8]$$

The tracking error signal TE is obtained by the difference detection operation $$TE=33a-33b \qquad [9]$$

because only approximately 30% of the light from the polarized light separation plane 23a incident on the second polarized light separation plane 23c passes, is reflected by the slope 23b, and is incident on the photodiode 33.

The photo-electro-magnetic signal RF is obtained as described with reference to FIG. 6, and is here omitted.

As with the first embodiment above, it is therefore possible by means of this embodiment to achieve a magneto-optical pick-up having high light utilization efficiency, a sufficient S/N ratio in the photo-electro-magnetic signal, high reliability, high durability, and a compact, low-cost construction. In addition, by detecting the focus error signal FE and the tracking error signal FE using different photodiodes, it is only necessary to divide the photodiodes 18 and 19 receiving the +/−1St. order light diffracted by the holographic diffraction grating 22 into three segments, rather than the six shown in FIG. 8, in order to detect the focus error signal FE. As a result, the electrical wiring from each element on the substrate 16 is simplified, and a lower cost can be achieved.

It is also possible to achieve a magneto-optical pick-up whereby the segmented light spot received by the elements 18n–18p and 19n–19p of the photodiodes 18 and 19 does not deviate from the respective receptor element segments, i.e., the magneto-optical pick-up is resistant to the effects of wavelength disturbance, even when the wavelength of the emissions from the laser diode 17 varies due to external noise and the diffraction angle of the segmented holographic diffraction grating 27 thus fluctuates. This is because the length of the segments in the direction parallel to the orientation of the photodiodes 18 and 19 is sufficiently greater than the diameter of the segmented light spot received by said segments.

There is also less light loss when light is received by the photodiodes because there are fewer dividing lines in each photodiode used for error detection. As a result, a magneto-optical pick-up with a stable error detection operation can be achieved.

[Embodiment 7]

A seventh embodiment of a magneto-optical pick-up according to the present invention is described below with reference to FIGS. 16 and 17. Note that like parts in this embodiment and that described above are identified by like references, and further detailed description thereof is omitted below.

Figure 16:
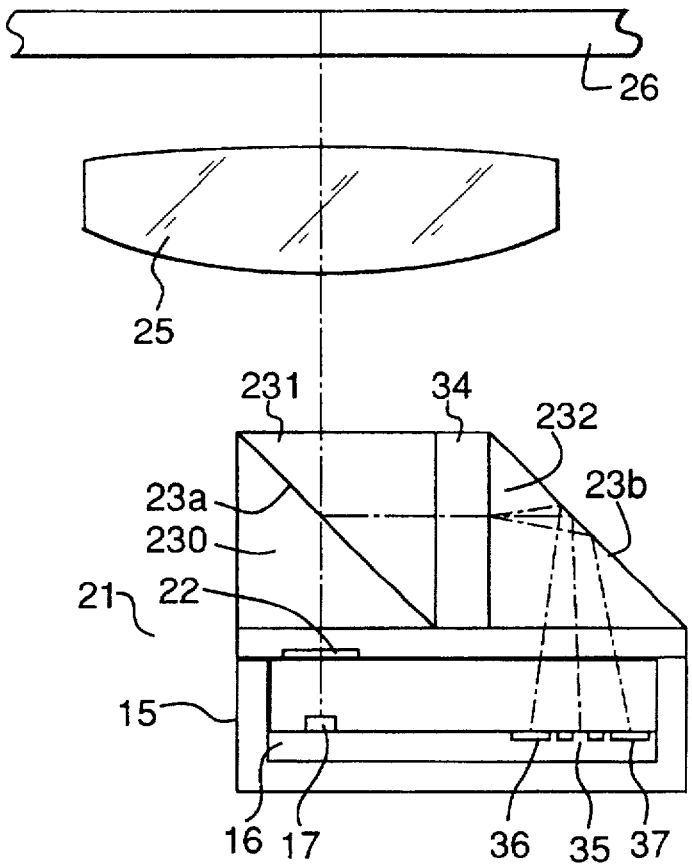
FIG. 16 is a conceptual side view of a magneto-optical pick-up according to the seventh embodiment of the invention.
Figure 17:
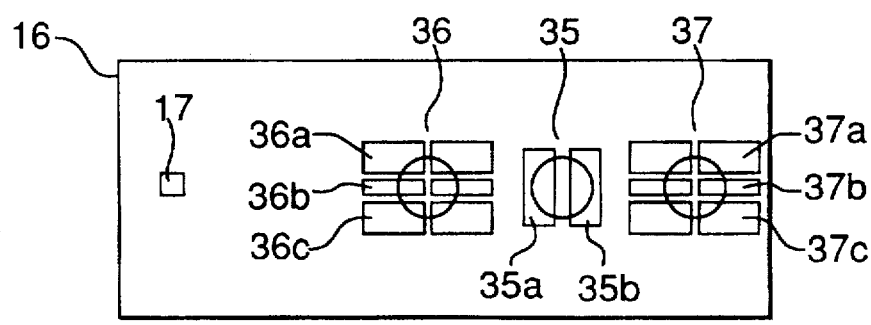
FIG. 17 is a plan view of the receptor element and light-emitting element.

FIG. 16 is a conceptual side view of a magneto-optical pick-up according to the seventh embodiment of the invention, and FIG. 17 is a plan view of the receptor element and light-emitting element in this embodiment.

As shown in FIG. 16, the holographic diffraction grating 22 and the photodiodes 18 and 19 arrayed on opposite sides of the laser diode 17 are eliminated in this embodiment. A polarizing holographic diffraction grating 34 is disposed internally to the polarizing prism 23 with a photodiode 35 disposed in a position receiving the 0-order light passed by the polarizing holographic diffraction grating 34, a photodiode 36 similarly positioned to receive the +1St. order light, and another photodiode 37 positioned to receive the −1St. order light.

The polarizing holographic diffraction grating 34 is made, for example, from lithium niobate, separates the light incident thereon into two mutually-perpendicular linear polarized light components, emits one of these linear polarized light components as zero order light, and emits the other linear polarized light component as +1St. or −1St. order light. The polarizing holographic diffraction grating 34 has a lens effect whereby the focal points of +1St. order and −1St. order diffracted light differ. As a result, the +1St. order diffracted light is focused, for example, at a point closer to the polarizing holographic diffraction grating 34 than the photodiode 36, and the −1St. order diffracted light is focused at a point beyond the photodiode 37. In addition, the 0-order light is not focused on the other photodiode 35. As a result of these focal point differences, the diameters of the light spots formed on the +/−1St. order light photodiodes 36 and 37 differ, and the sizes of these photodiodes 36 and 37 are also varied in order to correctly obtain the focus error signal FE. The photodiodes 36 and 37 are divided into three elements 36a–36c and 37a–37c, respectively, in the direction perpendicular to the orientation axis of the photodiodes, and the other photodiode 35 is divided into two elements 35a and 35b in the direction parallel to the orientation axis of the photodiodes 36 and 37.

The basic operation of this embodiment is identical to that of the preceding embodiments, and further description is therefore omitted. However, it should be noted that the photo-electro-magnetic signal RF is obtained by the difference detection operation $$RF=(35a+35b)-\{(36a+36b+36c)+(37a+37b+37c)\}, \qquad [10]$$

the focus error signal FE is obtained by the difference detection operation $$FE=(36a+36c+37b)-(36b+37a+37c) \qquad [11]$$

and the tracking error signal FE is obtained by the difference detection operation $$TE=35a-35b \quad [12]$$

As with the first embodiment above, it is therefore possible by means of this embodiment to achieve a magneto-optical pick-up having a sufficient S/N ratio in the photo-electro-magnetic signal, high reliability, high durability, and a compact, low-cost construction. The light utilization efficiency is also further improved because there are no light-dividing elements such as diffraction gratings in the light path between the laser diode 17 and magneto-optical recording medium 26 other than the polarizing prism 23.

By detecting the photo-electro-magnetic signal RF, focus error signal FE, and tracking error signal TE with common photodiodes 35-37, the area of the substrate 16 occupied by photodiodes can be reduced, and the size and cost of the magneto-optical pick-up can therefore also be further reduced.

[Embodiment 8]

A seventh embodiment of a magneto-optical pick-up according to the present invention is described below with reference to FIGS. 18 and 19. Note that like parts in this embodiment and that described above are identified by like references, and further detailed description thereof is omitted below.

Figure 18:
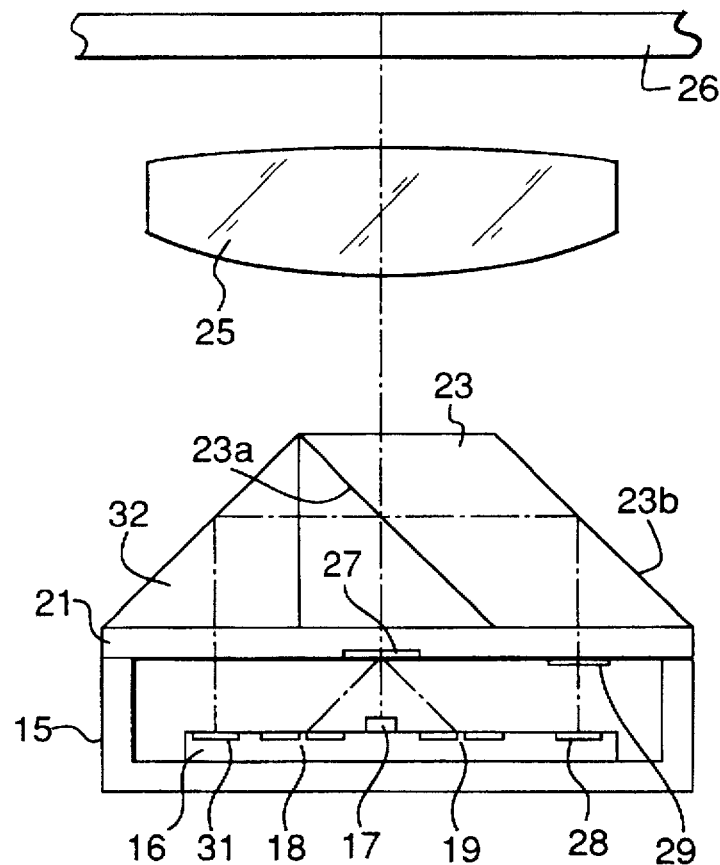
FIG. 18 is a conceptual side view of a magneto-optical pick-up according to the eighth embodiment of the invention.
Figure 19:
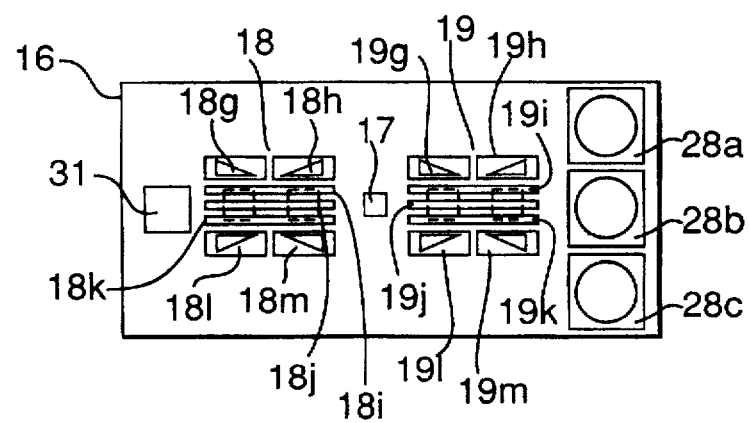
FIG. 19 is a plan view of the receptor element and light-emitting element.
Figure 20A:
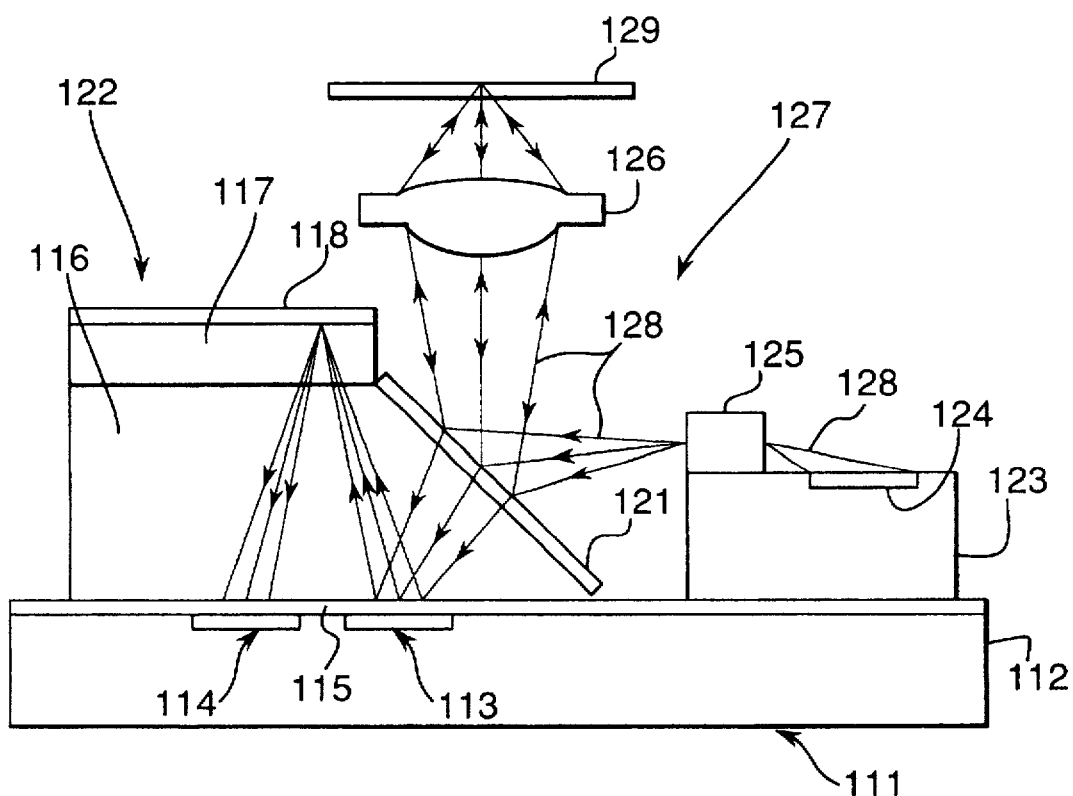
FIGS. 20A and 20B are a sectional of a conventional optical module and an enlarged plan view of photodiodes of FIG. 20A, respectively.
Figure 20B:
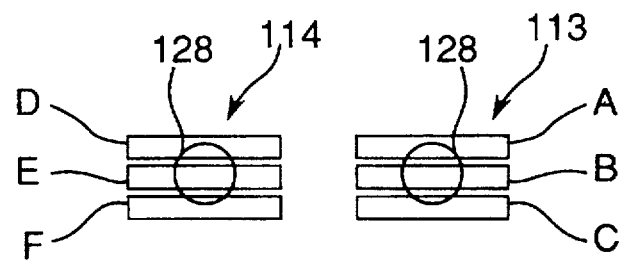

FIG. 18 is a conceptual side view of a magneto-optical pick-up according to the eighth embodiment of the invention, and FIG. 19 is a plan view of the receptor element and light-emitting element in this embodiment.

FIG. 18 is basically a combination of FIG. 3, FIG. 6, and FIG. 12. The difference is that the reflecting mirror 32 and polarizing prism 23 shown in FIG. 12 are integrated and use the reflecting surface 23d in common.

The essential configuration and basic operation of this embodiment are identical to those of the first, second, third, and fifth embodiments, and further description is therefore omitted.

It is therefore possible by means of this embodiment to achieve a magneto-optical pick-up having high light utilization efficiency, a sufficient S/N ratio in the photo-electro-magnetic signal, high reliability, high durability, and a compact, low-cost construction. It is also possible to determine the change in light quantity emitted from the laser diode 17, and to therefore achieve high performance completely unaffected by wavelength variations. By integrating the reflecting mirror 32 and polarizing prism 23, the number of optical components is also reduced, thereby further reducing the cost and number of assembly steps required.

By integrally disposing the laser diode 17, photodiodes 18, 19, and 28, and the monitor photodiode 31 on a single substrate 16, circuit connections on the substrate 16 are also simplified, the cost of the means for connecting the magneto-optical pick-up to external components and the cost of the substrate 16 can be further reduced, and a magneto-optical pick-up with strong resistance to noise can be achieved.

[Effects of the invention]

As described hereinabove, a magneto-optical pick-up according to the present invention integrates the optical module with the polarizing prism of which the reflectivity and transmittance of P-polarized light and S-polarized light differ. It is therefore possible to achieve a compact, high light utilization efficiency magneto-optical pick-up assuring a sufficient S/N ratio in the photo-electro-magnetic signal. By further integrating the analyzer with the optical module or providing the analyzer within the optical module, an even more compact, low cost magneto-optical pick-up can be achieved.

By sealing the optical module, the reliability and durability of the magneto-optical pick-up can also be further improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical pick-up comprising
   an optical module comprising an integral light-emitting element and receptor element having plural light reception areas, and a diffraction grating on the light incidence/emission plane;
   a condensing element for irradiating light emitted from said light-emitting element to said information recording medium;
   a polarizing prism provided integrally to said optical module in the light path between said light-emitting element and said condensing element, and having the reflectivity and transmittance differing for P-polarized light and S-polarized light; and
   a polarizing element provided internally or integrally to said optical module for dividing the light reflected by the information recording medium, passed again through said condensing element and passed again through or reflected by said polarizing prism into lights having at least two mutually-perpendicular polarization components, and guiding the divided light to said receptor element having plural light reception areas.

2. The magneto-optical pick-up according to claim 1 wherein said light-emitting element and receptor element having plural light reception areas are arrayed on the same substrate.

3. The magneto-optical pick-up according to claim 1 wherein said light-emitting element, said receptor element having plural light reception areas, and said polarizing element are arrayed on the same substrate.

4. The magneto-optical pick-up according to claim 1 wherein said diffraction grating has a lens effect.

5. The magneto-optical pick-up according to claim 1 wherein said diffraction grating has a lens effect, and is divided into plural areas of differing patterns.

6. The magneto-optical pick-up according to claim 1 wherein said polarizing element is a polarizing diffraction element.

7. The magneto-optical pick-up according to claim 6 wherein said polarizing prism and polarizing element are integrally comprised.

8. The magneto-optical pick-up according to claim 6 wherein said polarizing prism has at least two polarized light separation planes of which the reflectivity and transmittance differ for P-polarized light and S-polarized light.

9. The magneto-optical pick-up according to claim 1 further comprising internally to said optical module a monitoring receptor receiving part of the light emitted from said light-emitting element and reflected or passed by said polarizing prism.

10. The magneto-optical pick-up according to claim 1 wherein said polarizing element is a Wollaston prism.

11. A magneto-optical pick-up comprising
    a receptor element having plural light reception areas;
    a light-emitting element provided on substantially the same plane as said receptor element;
    a condensing element for irradiating light emitted from said light-emitting element to an information recording medium;

a roughly trapezoidal polarizing prism provided in the light path between said light-emitting element and said condensing element, and having a polarized light separation plane of which the reflectivity and transmittance differ for P-polarized light and S-polarized light;

a monitoring receptor provided on substantially the same plane as said receptor element and receiving light emitted from said light-emitting element and reflected by an inclined plane and polarized light separation plane of said polarizing prism;

a transparent substrate comprising a diffraction zone having plural different-pattern separation zones each having a lens effect, and guiding light reflected from the information recording medium, passed again through said condensing element, and then passed through the polarized light separation plane of said polarizing prism to one of the plural reception areas of said receptor element; and a polarizing element dividing the light reflected from the information recording medium, passed again through said condensing element, and reflected by an inclined plane and polarized light separation plane of said polarizing prism into lights having at least two mutually-perpendicular polarization components, and guiding the divided light to one area of said receptor element having plural light reception areas; and wherein said receptor element having plural light reception areas, light-emitting element, monitoring receptor, and polarizing element are installed inside a housing, said housing is sealed with a transparent substrate, and said polarizing prism is disposed integrally to said transparent substrate.

12. The magneto-optical pick-up according to claim 11 wherein an inert gas is filled in said housing sealed by said transparent substrate.

13. A magneto-optical pick-up comprising an optical module comprising an integral light-emitting element and receptor element having plural light reception areas;

a condensing element for irradiating light emitted from said light-emitting element to an information recording medium;

a polarizing prism provided integrally to said optical module in the light path between said light-emitting element and said condensing element, and having the reflectivity and transmittance differing for P-polarized light and S-polarized light; and a polarizing diffraction element provided integrally to said optical module and polarizing prism, dividing the light reflected by the information recording medium, passed again through said condensing element and reflected by or passed again through said polarizing prism into lights having at least two mutually-perpendicular polarization components, and guiding the divided light to said receptor element having plural light reception areas.

* * * * *